United States Patent [19]

Kettle, Jr. et al.

[11] Patent Number: 5,542,891

[45] Date of Patent: Aug. 6, 1996

[54] APPARATUS FOR INTERLOCKING REVERSER HANDLE ON A CONTROL STAND OF A RAILWAY LOCOMOTIVE

[75] Inventors: Paul J. Kettle, Jr., Pittsburgh; Ralph Santoro, Jr., New Kensington; Vincent Ferri, Pittsburgh, all of Pa.

[73] Assignee: Westinghouse Air Brake Company, Wilmerding, Pa.

[21] Appl. No.: 340,538

[22] Filed: Nov. 16, 1994

[51] Int. Cl.⁶ .................................................. B60K 41/28
[52] U.S. Cl. ........................ 477/96; 74/567; 74/528; 74/527; 74/569; 74/526; 74/483 R; 477/94
[58] Field of Search .......................... 74/567, 528, 527, 74/569, 526, 483 R, 335, 475, 477, 497; 477/96, 94, 92

[56] References Cited

U.S. PATENT DOCUMENTS

| | | |
|---|---|---|
| 3,715,579 | 2/1973 | Eblovi . |
| 3,794,834 | 2/1974 | Auer, Jr. et al. . |
| 3,805,056 | 4/1974 | Birkin . |
| 3,842,653 | 10/1974 | Blonn, Sr. .................... 477/96 |
| 5,016,840 | 5/1991 | Bezos . |
| 5,453,732 | 9/1995 | Takano ........................ 74/335 X |

Primary Examiner—Charles A. Marmor
Assistant Examiner—David Fenstermacher
Attorney, Agent, or Firm—James Ray & Associates

[57] ABSTRACT

Apparatus for interlocking independent control handles for throttle action, dynamic brake action and reverser action, within a control stand for a railway locomotive to permit controlled removal of a reverser control handle in which a first and second cam disks are mounted to a first and second axle for rotation with a throttle handle and a dynamic brake handle such that the disks will interlock with each other so that neither the throttle or dynamic handle can be rotated unless the other is in an "off" position, and having a pivotal lock member secured to the reverser axle, with a member thereon adapted to pivotally lock the reverser lever handle in place when it is secured to the reverser axle. First and second arcuate guide members are provided to engage the pivotal lock member throughout its pivotal rotation with the reverser axle, and includes a member thereon to permit the pivotal lock members to be pivoted to allow removal and insertion of the reverser lever handle when it is in the "neutral" position and the throttle and dynamic brake handles are in the "off" position.

18 Claims, 8 Drawing Sheets

FIG. 13

APPARATUS FOR INTERLOCKING REVERSER HANDLE ON A CONTROL STAND OF A RAILWAY LOCOMOTIVE

FIELD OF THE INVENTION

The present invention relates generally to a control stand for a locomotive or other railway transit vehicle, and more particularly to mechanical apparatus for interlocking the throttle, dynamic brake, and reverser control handles to either allow or preclude certain control handle motions, and even more particularly, to interlock the reverser control handle to allow controlled removal thereof and lock-up of the control stand only when the three control handles are properly positioned.

CROSS REFERENCE TO RELATED APPLICATIONS

The invention taught in this patent application is closely related to the inventions taught in the following copending patent applications: 08/340,525 Electronically Controlled Locomotive Throttle Controller Including Remote Multiple Unit Throttle Control; 08/340,651 Method And Apparatus For Determining And Encoding The Position Of A Reverser Handle On A Locomotive Control Stand; 08/340,235 Digital Output Control Device and Method For Operating; 08/340, 239 Method And Apparatus For Feedback Of Trainline Status To The Central Processor Of A Locomotive Throttle Controller; 06/340,215 Apparatus For Interlocking Throttle, Dynamic Brake And Reverser Handles On A Control Stand Of A Railway Locomotive; 08/340,652 Method Of Performing Diagnostics On An Electronically Controlled Railway Locomotive Throttle Controller; 08/340,237 Method Of Operating A Locomotive Mounted Throttle Controller Between Two Modes Of Operation Including A Transition Between Such Two Modes; 08/340,742 An Apparatus For And A Method Of Generating An Analog Signal For Control Of Dynamic Braking; 08/340,232 An Apparatus For Feedback Of An Analog Signal Used To Monitor And/Or Control Dynamic Braking and Method of Operating; 08/340,213 An Apparatus To Enable Controlling A Throttle Controller From A Remote Host; and, 08/340,526 Apparatus For Determining The Absolute Position Of Throttle, Dynamic Brake And Reverser Handles On A Locomotive Control Stand. Each of the above-referenced patent applications is being filed concurrently herewith and is assigned to the assignee of this invention. The teachings of all of these patent applications are incorporated herein by reference thereto.

BACKGROUND OF THE INVENTION

In railroad locomotive operations, the throttle, dynamic brake and reverser actions of the locomotive, locomotives or other drive units, are controlled by the operator or engineer in the cab of the lead unit by manipulating three handles extending from the control stand, one handle each for throttle, dynamic brake, and reverser. The throttle handle, of course, controls the development of the tractive effort of the locomotive; i,e the diesel engines or other power units. The dynamic brake handle controls the development of a retarding force known as a dynamic brake, for example the electric motors driving the locomotive wheels, to place them in either motor mode where they will drive the wheels, or in generator mode, where they will function as a retarding force. The reverser handle controls the forward and reverse rotation of the electric motors to selectively drive the train forward or rearward, and includes a neutral position. Pursuant to current practice, the control stand is designed to be a man-to-machine interface and ideally is strictly an electronic/electric device having no direct mechanical, hydraulic or pneumatic connections to the devices controlled. Instead, encoding means are preferably provided within the control stand to read and interpret the positions of the three handles, and convey appropriate signals, indicative of such positions, to an associated microcomputer. The associated microcomputer is programmed to interpret the encoded signals regarding the positions of the throttle, dynamic brake and reverser handles, as positioned at the control stand, and then electronically issue corresponding commands to manipulate the devices intended within the locomotive or locomotives. When utilizing a microcomputer, the throttle, dynamic brake and reverser commands effected at the control stand, are dependent upon the given angular positions of the three control handles, which are normally sensed and monitored by rotary encoding devices, which are mechanically coupled to associated rotary axles to which the control handles are secured, utilizing cams to actuate microswitches or contacts to provide a signal to the microcomputer as noted above. Such mechanical devices leave a lot to be desired, in that they do not provide the exacting degree of handle position determination as desired, are prone to mechanical failure, are cumbersome, space consuming, and require frequent adjustment.

It has of course been highly desirable to provide an interlocking mechanism within the control stand to prevent certain handle movements which are inconsistent with the intended results, such as simultaneously requiring throttle and dynamic brakes actions, or application of the dynamic brake when the reverser is in neutral. While a variety of such interlocking mechanisms have been utilized in the prior art control stands, most tend to be rather complicated, utilizing a significant number of moving parts which greatly complicate assembly of the control stand, and lead to limited durability and reliability.

Co-pending patent application titled: Apparatus For Interlocking Throttle, Dynamic Brake and Reverser Handles on a Control Stand of a Railway Locomotive, Ser. No. 08/340, 215, filed Nov. 16, 1994, and assigned to the same assignee, discloses and claims apparatus for interlocking independent control handles for throttle action, dynamic brake action and reverser action, within a control stand for a railway locomotive which effectively interlocks the throttle and dynamic brake handles to each other and to the reverser control handle as necessary permitting only allowable motions of the three handles. The above co-pending patent application does not, however, include any interlocking means for permitting removal of the reverser control handle, which is another desired and common feature. That is to say, it is further common practice to permit the reverser control handle to be removable from the control stand by the operator or engineer to essentially lock-out the control stand, as for example, when he leaves the cab, to thereby assure that if an unauthorized person thereafter enters the cab, that such person will not be able to operate the control stand. In this regard, it is further essential that interlocks be included to assure that the reverser control handle be removable only when the throttle and dynamic brake are inactive, that is, when the dynamic brake is in the "off" position, the throttle is in the "off" or "idle" position, and the reverser is in the "neutral" position.

Since all three of the above conditions must be met to permit removal of the reverser control handle, interlocking apparatus of the prior art was rather complicated, often time including three separate locking means, each of which have to be interlocked to recognize the position of one each of the other handles, and thereby maintain or release the lock in responses to such three separate determinations.

SUMMARY OF THE INVENTION

The present invention is predicated upon a new and unique interlocking mechanism that is passive in nature and employs a compact system entirely integrated with the reverser control handle hardware, which utilizes only one locking mechanism which is operable by control means associated with the all three control handles, and can readily be incorporated with apparatus disclosed in the above identified co-pending patent application, as well as interlocking apparatus of other designs.

In essence, the interlocking apparatus of this invention can be incorporated into any more or less conventional control stand having a first pivotal lever handle for controlling throttle action secured to a first rotatable axle, a second pivotal lever handle for controlling dynamic brake action secured to a second rotatable axle, which further includes interlocking mechanism which serves to prevent either one of the throttle control handle or the dynamic brake control handle from being moved from the "off" position unless the other handle is in the "off" position. With regard to the throttle handle, an "idle" position is equated to an "off" position for purposed of the description below. A third pivotal lever handle for controlling reverser action secured to a third rotatable axle is also required. As noted above, it is also conventional practice, that the third pivotal lever handle, i.e., the one for reverser control, is pivotal to only three positions, namely, a "neutral" position at the center, and "forward" and "reverse" positions at either end. Typically, the reverser handle is removable when in the "neutral" position, with such removable handle often referred to as a "train key" to thereby virtually "lock" the control stand with the throttle lever handle in the "off" or "idle" position, the dynamic brake lever handle in the "off" position, and the reverser handle, of course, in the "neutral" position. With the reverser handle so removed, the control panel cannot be operated.

In addition to a pivotal reverser control handle, as described above, another essential element of the instant inventive interlocking mechanism includes a first cam disk, perpendicularly mounted for partial rotation with one or the other of the axles partially rotated by the throttle or reverser control handles. Since the interlocking apparatus disclosed and claimed in the above referenced co-pending patent application does in fact include a pair of interlocking cam disks, that interlocking apparatus is particularly suited for combination with this inventive apparatus for interlocking the reverser control. It is further presumed that the interlocking cam disk be capable of interlocking with each other such that neither one of them; i.e., throttle handle and dynamic brake handle, can be moved away from the "off" position unless the other is in the "off" position.

In addition to the above, a pivotal lock member is secured to the reverser axle, having a means thereon adapted to pivotally lock the reverser handle in place to secure it to the reverser axle. A first guide means is secured to a structural member of the control stand, which is adapted to continuously engage the pivotal lock member throughout rotation thereof with rotation of the reverser axle, such that this first guide means is adapted to permit the pivotal lock member to be pivoted when the reverser axle is in the "neutral" position. When the lock means is allowed to pivot, then the reverser handle, or the reverser pivot handle (i.e., the "train key") can be removed. A second guide means, however, is necessary, which is secured to one or the other of the cam disks as described above, which is also adapted to continuously engage the pivotal lock member throughout rotation thereof with rotation of said reverser axle. This said second guide means is adapted to permit the pivotal lock member to be pivoted only when the throttle and dynamic brake are both in an "off" position (or at least an "idle" position with regard to the throttle). Accordingly, the pivotal reverser handle (i.e. the "train key") can be removed only when the first guide means recognizes that the reverser control is in the "neutral" position, and the second guide means recognizes that and throttle control handle is in the "off" or "idle" position. Because the interlocking apparatus of the abovecited co-pending patent application will not permit movement of the reverser control handle when the dynamic brake is in an "on" position, it is not necessary to provide any guide means to recognize that it is in an "off" position.

OBJECTS OF THE INVENTION

It is, therefore, one of the primary objects of the present invention to provide a new and improved mechanical apparatus for interlocking the reverser control handle with the throttle and dynamic control handles in a control stand of a locomotive or other railway transit vehicle, to either allow or preclude certain control handle motions to provide proper manual sequencing of independent control handle motions, safety lockout. of certain undesired motions, and tactile feedback to the operator or engineer that attempted control handle motions are allowed or not allowed.

It is another primary object of the present invention to provide a new and improved mechanical apparatus for interlocking the reverser control handle with the throttle and dynamic brake control handles in a control stand for a locomotive or other railway transit vehicle, to permit removal of the reverser control handle only under conditions whereby it is safe to do so.

It is a further primary object of the present invention to provide a new and improved mechanical apparatus for interlocking the reverser control handle with the throttle and dynamic brake control handles in a control stand for a locomotive or other railway transit vehicle, to permit removal of the reverser control handle only when the reverser handle is in the "neutral" position, and the throttle and dynamic brake handles are in the "off" position.

It is still another object of the present invention to provide a new and improved mechanical apparatus for interlocking the reverser control handle with the throttle and dynamic brake control handles in a control stand for a locomotive or other railway transit vehicle, to permit removal of the reverser control handle only when the reverser handle is in the "neutral" position, and the throttle and dynamic brake handles are in the "off" position, which utilizes only one locking means controllable by sensing devices associated with each of the three handles.

These and other objects and advantages will be realized from a full understanding of the following detailed description particularly when read in conjunction with the attached drawings, as described below.

DESCRIPTION OF A PREFERRED EMBODIMENT OF THE INVENTION

Prior to proceeding with a more detailed description of the interlocking apparatus of this invention, it should be noted that throughout the several views illustrated in the attached drawings, identical components which have associated therewith identical functions have been identified with identical reference numerals for the sake of clarity.

Reference is now to the several figures. Schematically illustrated therein is the inventive apparatus for interlocking the reverser control handle to permit its removal when in the "neutral" position and when the throttle and dynamic brake handles are in the "off" position. End views of the apparatus for interlocking the three handles together are also shown in FIGS. 4–9. More detailed views of this apparatus can be seen in the above-referenced co-pending patent application, the teaching of which is incorporated herein by reference.

Figure 1:
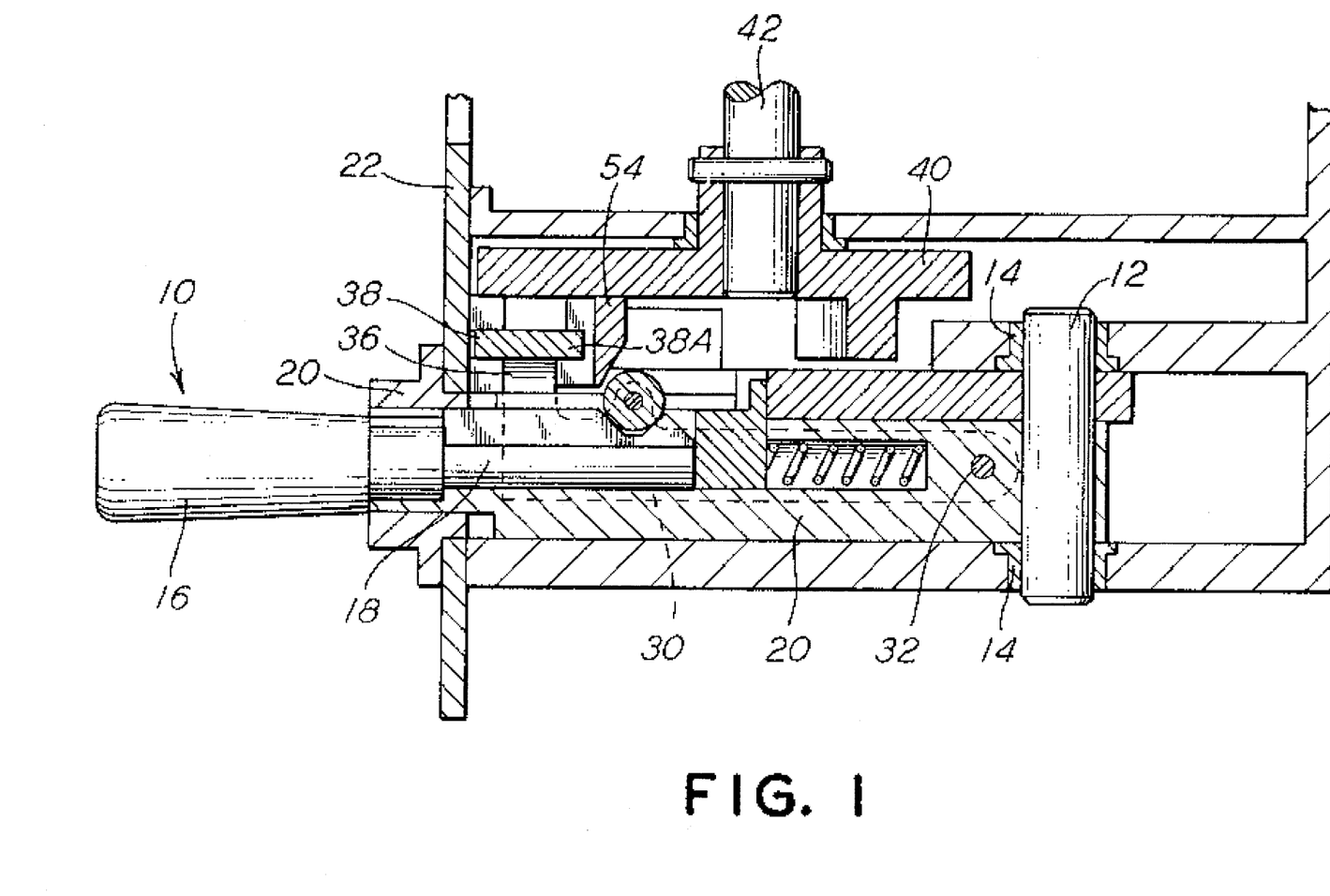
FIG. 1 is a sectional side view of one embodiment of the apparatus of this invention, depicting a side view of the reverser control mechanism with the reverser control handle positioned in a non-removable condition.
Figure 2:
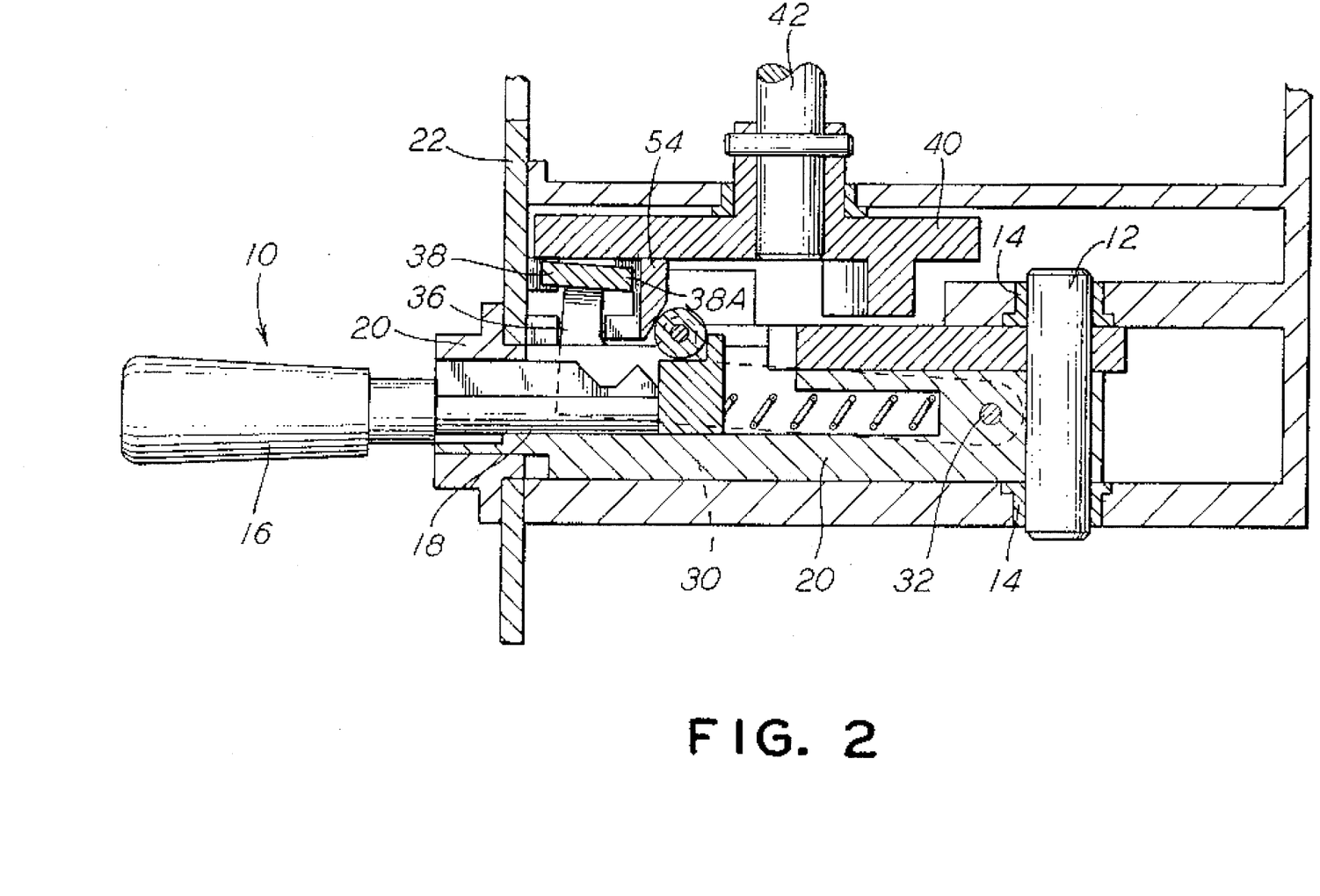
FIG. 2 is identical to FIG. 1 except that is depicts the reverser control handle in a removable position, and further shows the pivoted placement of the lock member as necessary to permit removal of the reverser control handle, while it is being removed.
Figure 3:
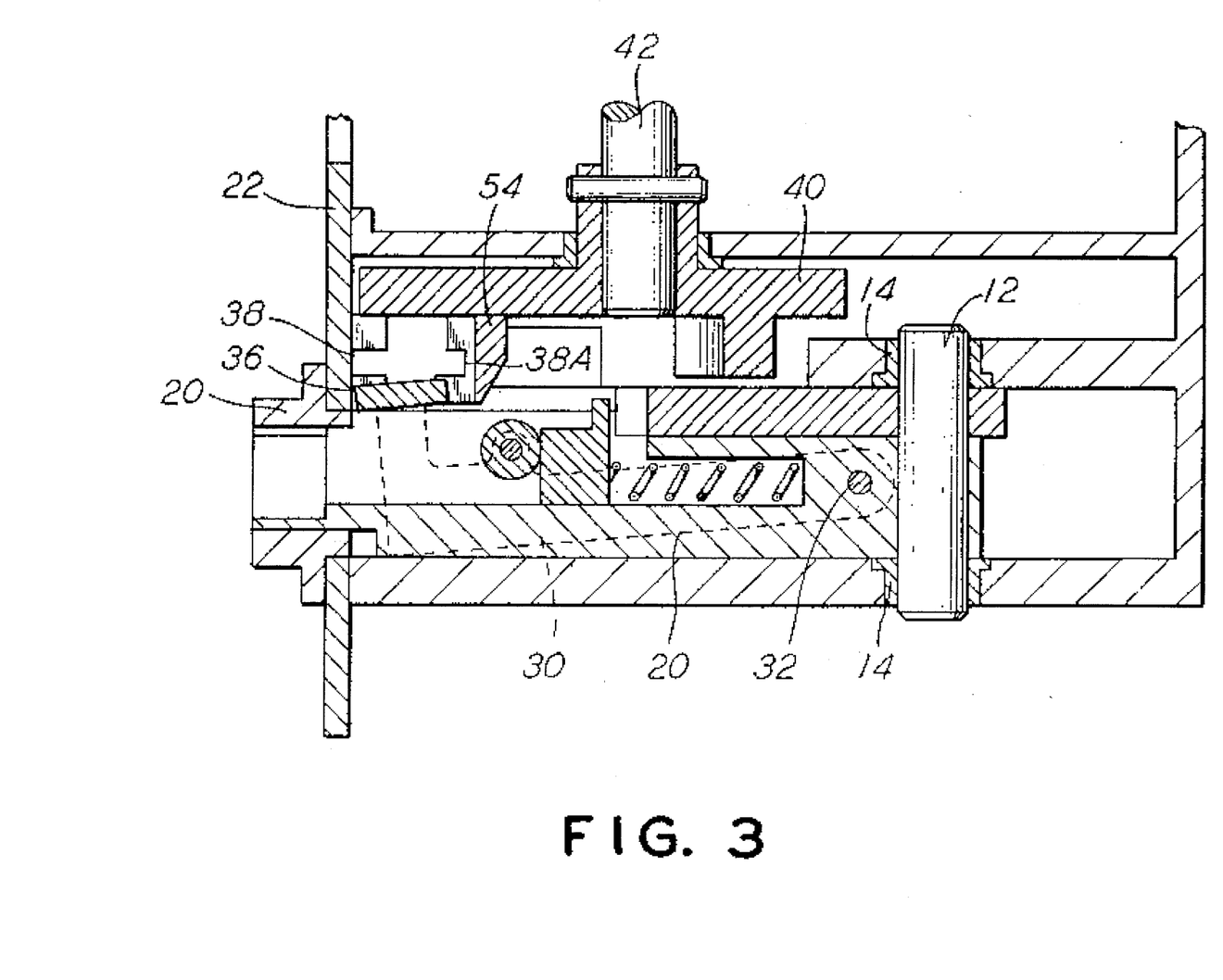
FIG. 3 is identical to FIGS. 1 and 2 except that is depicts the apparatus with the reverser control handle completely removed, as well as the pivotal placement of the lock member after the control handle has been removed.
Figure 4:
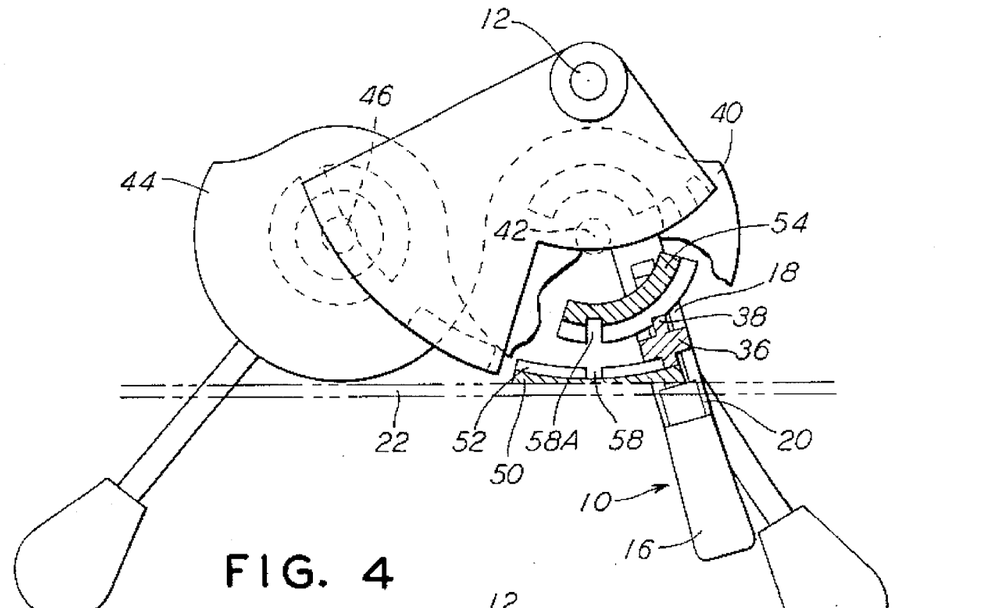
FIG. 4 is an axial end view of the entire locking mechanism, which includes a sectional end view of the apparatus shown in FIGS 1–3 taken at lines IV—IV of FIG. 1, and further including the interlocking mechanism as disclosed in the above referenced co-pending patent application, and illustrating both the throttle and dynamic brake handles in the "off" position and the reverser handle in the "forward" position, so that the reverser handle (train key) cannot be removed.
Figure 5:
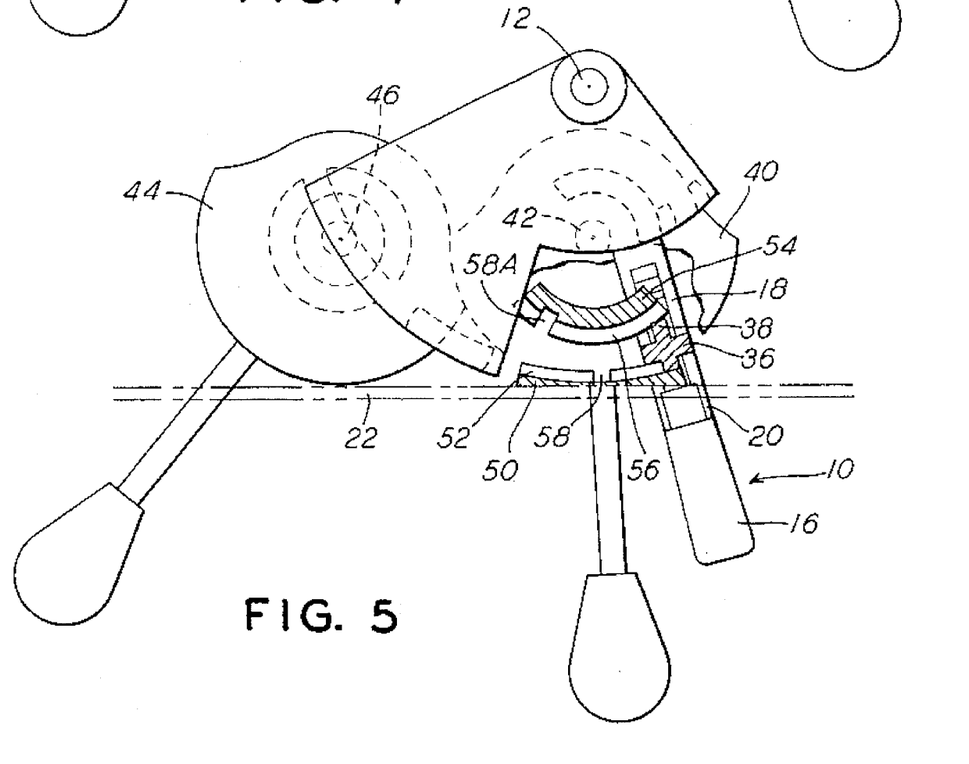
FIG. 5 is substantially identical to FIG. 4 except that is illustrates the throttle handle in any one of a number of "on" positions so that the so that the reverser handle cannot be moved from the "forward" position.
Figure 6:
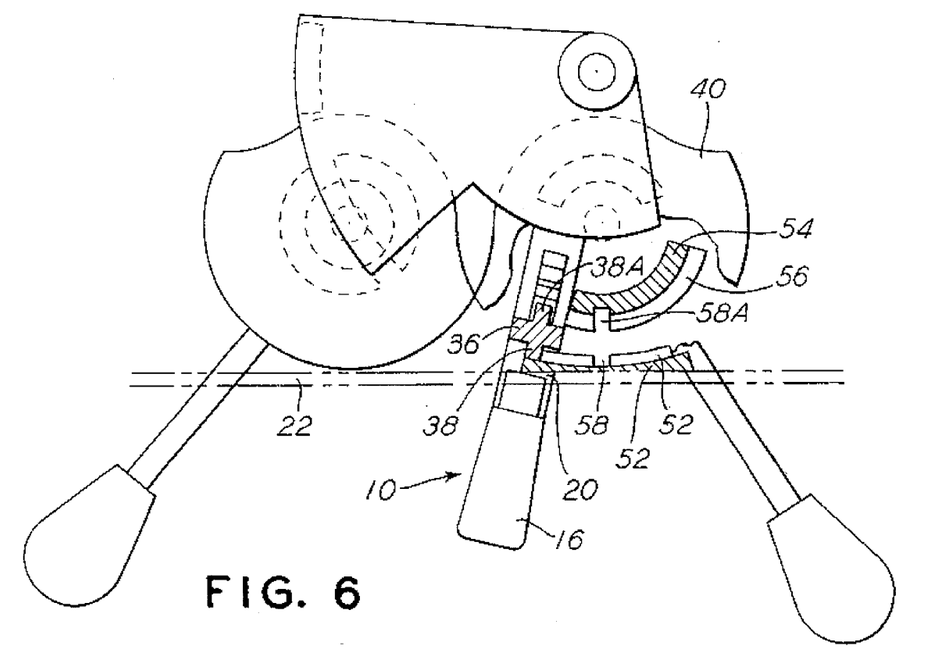
FIG. 6 is substantially identical to FIGS. 4 illustrating both the throttle and dynamic brake handles in the "off" position, but illustrating the reverser handle in the "reverse" position, again so that the reverser handle (train key) cannot be removed.
Figure 7:
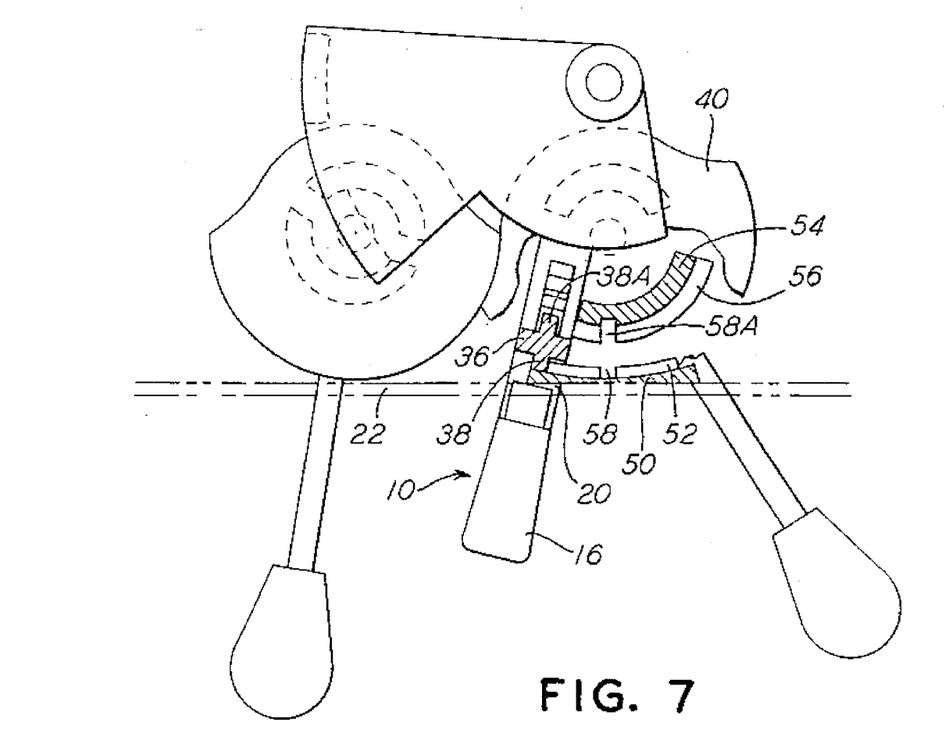
FIG. 7 is substantially identical to FIG. 5 but illustrating the dynamic brake handle in the "on" position and the reverser handle in the "reverse" position, again so that the reverser handle cannot be moved from the "reverse" position.
Figure 8:
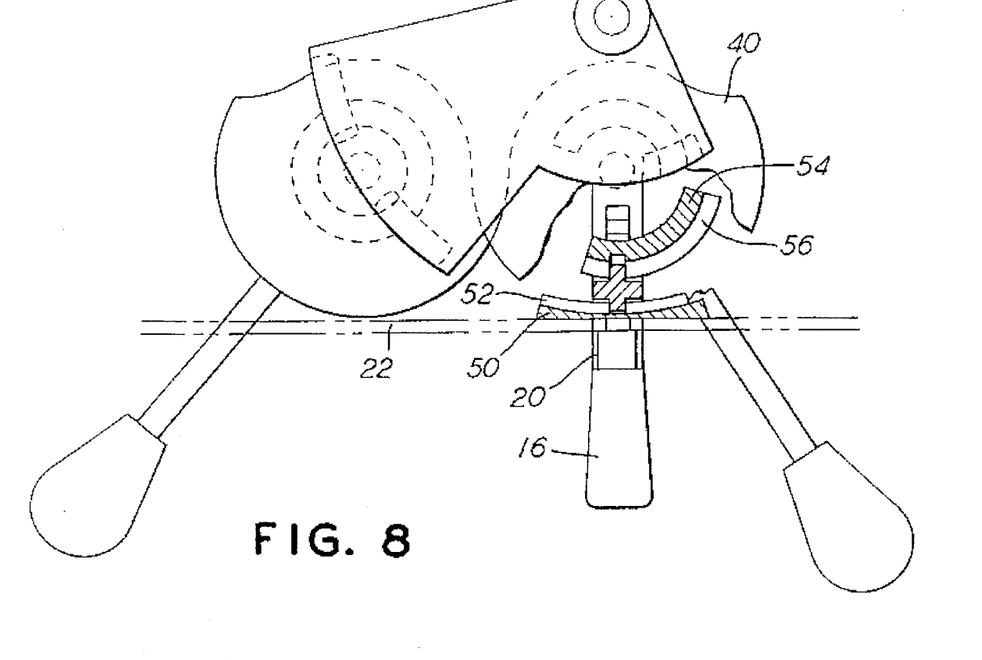
FIG. 8 is substantially identical to FIGS. 4 and 6 illustrating both the throttle and dynamic brake handles in the "off" position, but this time illustrating the reverser handle in the "neutral" position, so that the reverser handle (train key) can be removed.
Figure 9:
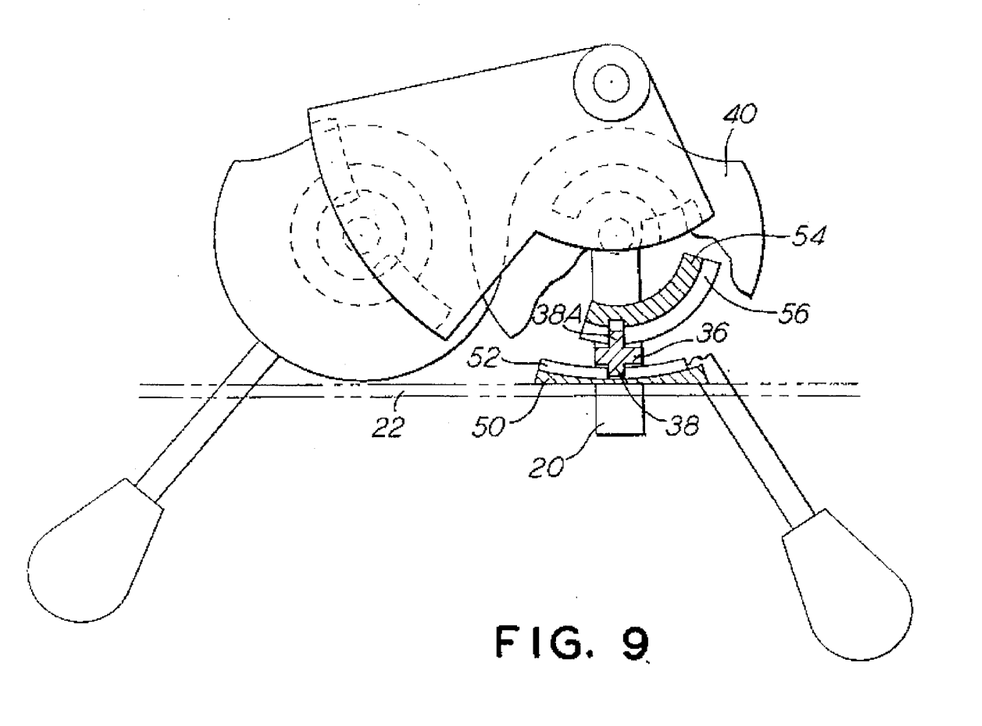
FIG. 9 is substantially identical to FIG. 8 illustrating both the throttle and dynamic brake handles in the "off" position, but this time illustrating that the reverser handle (train key) has been removed.
Figure 10:
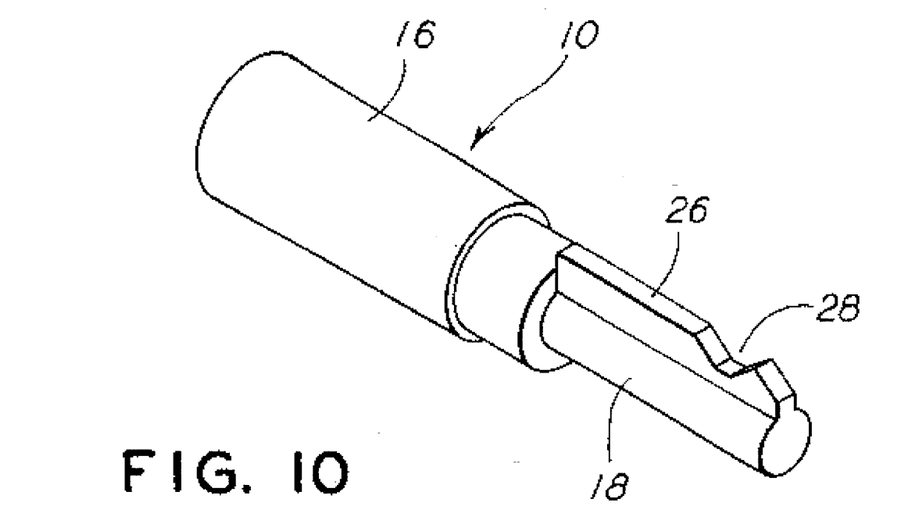
FIG. 10 is an isometric view of the removable reverser handle (train key) as utilized in the embodiment shown in the previous figures, as viewed from the back side.

With reference to the figures, therein is shown a reverser control handle, which in essence is an elongated lever handle, generally designated 10, which, as shown in FIGS. 1 and 2, is securable to reverser axle 12, which is partially pivotal within bushings 14. Accordingly, reverser control handle 10 is a lever handle adapted for pivotal lever motion with reverser axle 12. As can be seen more clearly in FIG. 10, reverser lever handle 10 comprises two main portions, namely a hand-grip handle portion 16 and a shaft member portion 18, which is insertable into the control stand for engagement with the reverser axle 12. Specifically, a socket member 20, is secured to axle 12, which extends from axle 12 to the face plate 22 of the control stand and beyond, such that a socket opening to the socket member 20, is disposed outside of the face plate 22, through which shaft member 18 is inserted and withdrawn. Also included as a part of reverser lever handle 10, is an elongated lock guide 26, having a rectangular cross-section and a lock V-notch 28 in the upper surface, rigidly secured along the top edge of shaft member 18, parallel to the axis thereof. Obviously, socket 20 must be provided with a rectangular cut-out at the top, adapted to receive lock guide 26. When fully inserted within socket member 20, reverser lever handle 10 must be pivotal to three positions; a central neutral position and forward and reverse positions at either end. As depicted in FIGS. 4–9, pivotal counter-clockwise motion to the right depicts the "forward" position, pivotal clockwise motion to the left depicts the "reverse" position, and the mid-position, with the handle extending vertically downward, is of course the "neutral" position.

Figure 11:
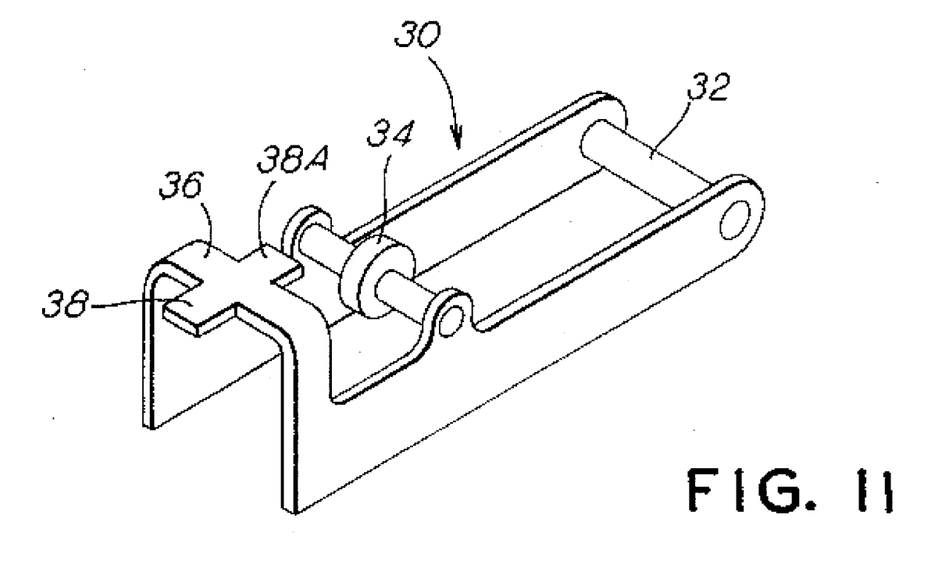
FIG. 11 is an isometric view of the lock member adapted to control removability of the reverser handle (train key) as utilized in the embodiment shown in the previous figures.

A lock member 30, more clearly illustrated in FIG. 11, is pivotally secured to socket member 20, adjacent to reverser axle 12 at pin 32, and adapted to pivotally move up and down, into and out of engagement with the locking guide 26 on shaft member 18. Specifically, lock roller 34 is rollably disposed transversely at the top of lock member 30, and adapted to engage the upper surface of lock guide 26 and drop into lock notch 28 to hold reverser lever handle 10 in position when inserted. Lock member 30, is also provided with a transverse bridge member 36, spanning across the upper forward portion, and having a pair of rectangular projections 38 and 38A at the mid-length, with projection 38 extending forward, and projection 38A extending rearward.

A first cam disk 40, is mounted to a first axle 42 for rotation therewith, and a second cam disk 44, is mounted to a second axle 46, whereby the first and second cam disks 42 and 44 are adapted to interlock with each other so that neither one of the first or second cam disk and axle combinations can be rotated unless the other combination is in an "off" position. The particular arrangement to effect this result is fully disclosed in the above-cited co-pending patent application, incorporated herein by reference, and need not, therefore, be further described herein. It should further be noted that the particular arrangement is not essential to the practice of this invention, provided that a disk of some sort is utilized comparable to cam disk 40, which, by virtue of its position, will indicate that the throttle or any associated control handle, is in the "off" position.

Figure 12:
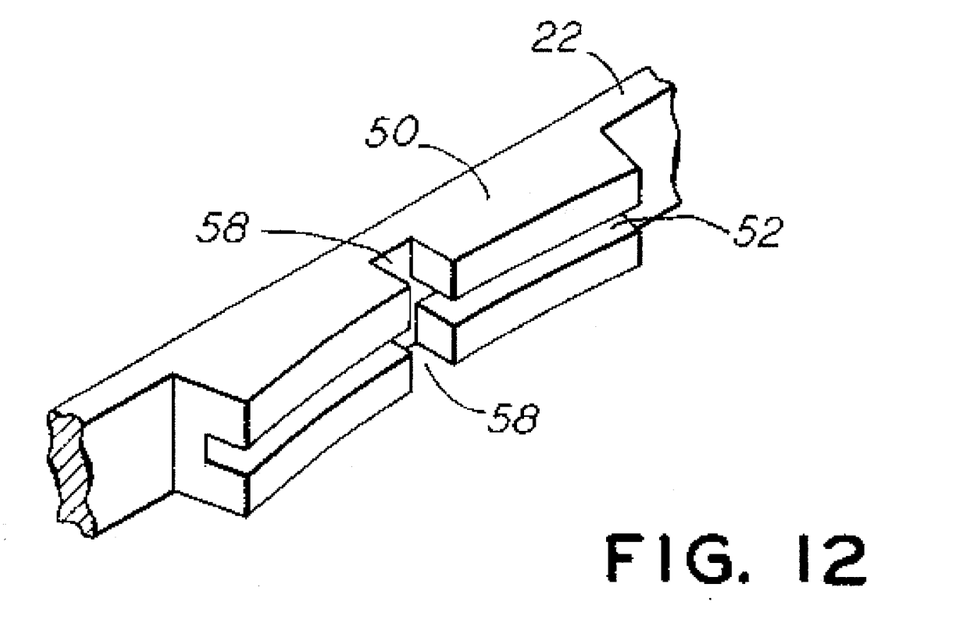
FIG. 12 is an isometric view of the first guide means as secured to a structural member opposed to the cam disk on the throttle axle as utilized in the embodiment shown in the previous figures.
Figure 13:
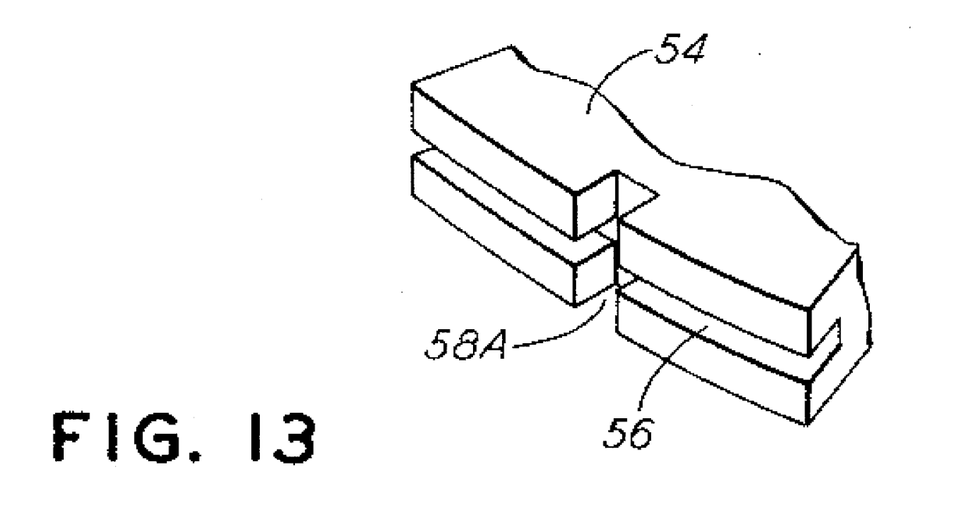
FIG. 13 is an isometric view of the second guide means as secured to the cam disk on the throttle axle opposed to the first guide means illustrated in FIG. 11 as utilized in the embodiment shown in the previous figures.

A first arcuate groove member 50, is secured to a structural member of the control stand, such as face plate 22, and disposed such that a first arcuate groove 52 therein partially encircling the reverser lever handle 10, or more precisely partially encircling socket member 20. A second arcuate groove member 54 is secured to the first cam disk 40, and disposed such that a second arcuate groove therein 56, is directly opposed from the first arcuate grove 52 in the first arcuate groove member 50. While this particular arrangement shows the second arcuate groove member 54 secured to the first cam disk 40 associated with the throttle control, it should be realized that it could be secured to the second cam disk 44 associated with the dynamic brake control, with comparable results, provided, of course, that the reverser socket member 20 were aligned under that cam disk 44, instead of cam disk 40 as shown.

Each of the first and second arcuate grooves 52 and 56 respectively, are provided with a rectangular notches 58 and 58A respectively, extending perpendicularly in each direction, such that said notches 58 in first arcuate groove member 50 vertically oriented with the "neutral" position, and such that the notches 58A in arcuate groove 54 also extend perpendicularly from groove 54, and will be directly opposed to notches 58, when the control lever handle associated with that cam disk (i.e., the cam disk 40, associated with the throttle control as shown) to which the second arcuate groove member 54 is attached is in an "off" position. As further illustrated, the projections 38, on lock member 30, are adapted to fit within groove 52, while projections 38A are adapted to fit within groove 56. Accordingly, when the reverser lever handle 10 is pivoted into any one of its three positions, projections 38 and 38a will slidably move within the arcuate grooves 52 and 56 respectively. As can further be seen, however, the axis of the reverser axle 12 is different from the axis of the first axle 42, so that projection 38A may not be completely positioned within arcuate groove 56 at all positions of rotation, but must be so positioned at least when the reverser lever handle 10 is proximate to the "neutral" position. When the two notches 58 and 58A are aligned, and reverser lever handle 10 is in the "neutral" position, reverser lever handle 10 can be withdrawn from socket member 20 as a "train key". A comparison of the various figures will illustrate how such removal is permitted. Specifically, as the reverser lever handle 10 is pulled from socket member 20, lock guide 26, on shaft member 18 will cause lock roller 34 to be biased upward, as lock roller 34 is lifted from V-notch 28, thereby pivotally lifting lock member 30. If the reverser lever handle 10 is not in the "neutral" position, it is clear that projection 38 will not be aligned with notch 58, and in such event, lock member 30 will not pivot upward when an attempt is made to withdraw the reverser lever handle 10, and therefore, it cannot be withdrawn. In a like manner, if notch 58A were not directly aligned with notch 58, then projection 38A would not be aligned notch 58A, and again, lock member 30 could not be pivotally lifted, and it would not be possible to remove the reverser lever handle 10. However, when notch 58A is aligned with notch 58, it will also be aligned with projection 38A, so that lock member 30 is capable of being pivotally moved upward with projection 38 moving into the upper portion of notch 58, and projection 38A moving into the upper portion of notch 58A. When reverser lever handle 10 is completely withdrawn from socket member 20, lock member 30 will move downward by the force of gravity so that projections 38 and 38A will fall into the lower portions of notches 58 and 58A respectively, thereby locking socket member 20 in place, so that none of the control handles can be moved from the locked position.

As should be apparent from the above detailed description, a number of modifications and other embodiments could be incorporated without departing from the spirit of the invention. Specifically, since the inventive apparatus is addressed primarily to means for interlocking the reverser pivotal handle 10 for purposes of controlling removal thereof, and as already suggested, other interlocking apparatus between the three handle could be combined to achieve the same results.

We claim:

1. Apparatus for interlocking independent control handles for throttle action, dynamic brake action and reverser action, within a control stand for a railway locomotive to permit controlled removal of a reverser control handle comprising:

a first lever handle for controlling throttle action secured to a first rotatable axle;

a second lever handle for controlling dynamic brake action secured to a second rotatable axle;

a reverser lever handle for controlling reverser action securable to a rotatable reverser axle, said reverser axle being pivotal to three positions, a central neutral position and forward and reverse positions at either end;

a first cam disk mounted to said first axle for rotation therewith, and a second cam disk mounted to said second axle for rotation therewith, said first and second cam disks adapted to interlock with each other such that neither one of said first or second axles can be rotated unless the other axle is in an "off" position;

a pivotal lock member having an engaging means thereon adapted to pivotally lock said reverser lever handle in place when said reverser lever handle is secured to said reverser axle, said pivotal lock member also having a follower means;

a first arcuate groove member secured to a structural member of said control stand and adapted to continuously engage said follower means of said pivotal lock member throughout rotation thereof with rotation of said reverser axle, said first arcuate groove member adapted to permit said pivotal lock member to be pivoted when said reverser axle is in the "neutral" position to allow removal of said reverser lever handle from said reverser axle; and a second arcuate groove member secured to one of said first or second cam disks, and adapted to continuously engage said follower means of said pivotal lock member throughout rotation thereof with rotation of said reverser axle, said second arcuate groove member adapted to permit said pivotal lock member to be pivoted when said first and second axles are in an "off" position to allow removal of said reverser lever handle from said reverser axle.

2. Apparatus for interlocking independent control handles for throttle action, dynamic brake action and reverser action, within a control stand for a railway locomotive, according to claim 1, in which said reverser lever handle comprises a handle portion attached to a shaft member, an end of said shaft member adapted to be insertable into, and removable from, a socket member secured to said reverser axle.

3. Apparatus for interlocking independent control handles for throttle action, dynamic brake action and reverser action, within a control stand for a railway locomotive, according to claim 2, in which said socket member secured to said reverser axle is provided with a compression spring against which said shaft member is biased when inserted therein.

4. Apparatus for interlocking independent control handles for throttle action, dynamic brake action and reverser action, within a control stand for a railway locomotive, according to claim 2 in which said engaging means on said pivotal lock member adapted to pivotally lock said reverser lever handle in place comprises a biased, pivotal roller.

5. Apparatus for interlocking independent control handles for throttle action, dynamic brake action and reverser action, within a control stand for a railway locomotive, according to claim 4 in which said biased, pivotal roller is adapted to engage a notch on said shaft member of said reverser lever handle.

6. Apparatus for interlocking independent control handles for throttle action, dynamic brake action and reverser action, within a control stand for a railway locomotive, according to claim 2 in which said pivotal lock member is pivotally secured to said reverser axle, and adapted to straddle said shaft member of said reverser lever handle when said reverser lever handle is attached to said reverser axle.

7. Apparatus for interlocking independent control handles for throttle action, dynamic brake action and reverser action, within a control stand for a railway locomotive, according to claim 1, in which said first arcuate groove member has a first arcuate groove radially encircling said reverser lever handle when said reverser lever handle is secured to said reverser axle, and said second arcuate groove member has a second arcuate groove therein directly opposed from said first arcuate groove in said first arcuate groove member, such that said follower means will engage and follow said first and second arcuate grooves when said reverser lever handle is pivoted.

8. Apparatus for interlocking independent control handles for throttle action, dynamic brake action and reverser action, within a control stand for a railway locomotive, according to claim 7, in which said follower means comprise a pair of opposed projections adapted for sliding motion within said first and second arcuate grooves disposed within said first and second guide members when said reverser lever handle is pivoted.

9. Apparatus for interlocking independent control handles for throttle action, dynamic brake action and reverser action, within a control stand for a railway locomotive, according to claim 8, in which each of said first and second arcuate grooves is provided with a radial slot therein such that said slots will be directly opposed to, each other when said pivotal lever handle associated with said[ cam disk to which said second arcuate groove member is attached is in an "off" position.

10. Apparatus for interlocking independent control handles for throttle action, dynamic brake action and reverser action, within a control stand for a railway locomotive, according to claim 9, in which said reverser lever handle is removable from said reverser axle only when said radial slots are aligned, such that partial removal of said reverser lever handle will cause said pivotal lock member to be pivoted sufficiently to pivotally move a first of said opposed projections into a first of said radial slots, and such that upon complete withdrawal of said reverser lever handle, said pivotal locking member will be pivoted in the opposite direction sufficiently to pivotally move a second of said opposed projections into a second of said radial slots, to thereby lock said reverser axle in position.

11. Apparatus for interlocking independent control handles for throttle action, dynamic brake action and reverser action, within a control stand for a railway locomotive to permit controlled removal of the reverser control handle comprising:

a first pivotal lever handle for controlling throttle action secured to a first rotatable axle;

a second pivotal lever handle for controlling dynamic brake action secured to a second rotatable axle;

a reverser lever handle for controlling reverser action secured to a rotatable reverser axle, said reverser lever handle being pivotal to three positions, a central neutral position and forward and reverse positions at either end;

a first cam disk mounted to said first axle for rotation therewith, and a second cam disk mounted to said second axle, said first and second cam disks adapted to interlock with each other such that neither one of said first or second axle can be rotated unless the other axle is in an "off" position;

a pivotal lock member having an engaging means thereon adapted to pivotally engage said reverser lever handle when said reverser lever handle is attached to said reverser axle, and such that removal and insertion of said reverser lever handle will cause said lock member to be partially pivoted away therefrom until reverser lever handle is completely removed and installed;

a first arcuate groove member secured to a structural member of said control stand and disposed such that a first arcuate groove therein radially encircles said reverser lever handle when said reverser lever handle is secured to said reverser axle; and a second arcuate groove member secured to one of said first or second cam disks, and disposed such that a second arcuate groove therein is directly opposed from said first arcuate groove in said first arcuate groove member;

each of said first and second arcuate grooves in said first and second arcuate groove members, having a radial slot therein such that said slots will be directly opposed to each other when said pivotal lever handle associated with said cam disk to which said second arcuate groove member is attached is in an "off" position; and said pivotal lock member having opposed projections adapted for sliding motion within said first and second arcuate grooves when said reverser lever handle is pivoted, and such that said reverser lever handle can be removed from said reverser axle only when said radial slots are aligned by causing said pivotal lock member to be pivoted sufficiently to cause a first of said opposed projections to be pivoted onto a first of said radial slots, and such that when said reverser lever handle is completely withdrawn, said pivotal lock member will be pivoted in the opposite direction causing a second of said opposed projections to be pivoted into a second of said radial slots, to thereby lock said reverser axle in position.

12. Apparatus for interlocking independent control handles for throttle action, dynamic brake action and reverser action, within a control stand for a railway locomotive, according to claim 11, in which said pivotal lock member is pivotally secured to said reverser axle.

13. Apparatus for interlocking independent control handles for throttle action, dynamic brake action and reverser action, within a control stand for a railway locomotive, according to claim 12 in which said pivotal lock member is adapted to straddle said shaft member of said reverser lever handle when said reverser lever handle is attached to said reverser axle.

14. Apparatus for interlocking independent control handles for throttle action, dynamic brake action and reverser action, within a control stand for a railway locomotive, according to claim 11 in which said engaging means on said pivotal lock member adapted to pivotally lock said reverser lever handle in place comprises a biased, pivotal roller adapted to rollably engage a notch on said shaft member of said reverser lever handle to hold said reverser lever handle in place when inserted.

15. Apparatus for interlocking independent control handles for throttle action, dynamic brake action and reverser action, within a control stand for a railway locomotive, according to claim 11, in which said reverser lever handle comprises a handle portion attached to a shaft member, an end of said shaft member adapted to be insertable into, and removable from, a socket member secured to said reverser axle.

16. Apparatus for interlocking independent control handles for throttle action, dynamic brake action and reverser action, within a control stand for a railway locomotive, according to claim 15, in which said socket member secured to said reverser axle is provided with a compression spring against which said shaft member is biased when inserted therein.

17. Apparatus for interlocking independent control handles for throttle action, dynamic brake action and reverser action, within a control stand for a railway locomotive, according to claim 11 in which said engaging means on said pivotal lock member adapted to pivotally lock said reverser lever handle in place comprises a biased, pivotal roller.

18. Apparatus for interlocking independent control handles for throttle action, dynamic brake action and reverser action, within a control stand for a railway locomotive, according to claim 17 in which said biased, pivotal roller is adapted to engage a notch on said shaft member of said reverser lever handle.

* * * * *

UNITED STATES PATENT AND TRADEMARK OFFICE
CERTIFICATE OF CORRECTION

PATENT NO. : 5,542,891
DATED : August 6, 1996
INVENTOR(S) : Paul J. Kettle, Jr.

It is certified that error appears in the above-indentified patent and that said Letters Patent is hereby corrected as shown below:

Column 1, line 31, delete "06/340,215" and insert --08/340,215--;
column 1, line 60, delete "i,e," and insert --i.e.--.
Column 2, line 32, delete "brakes" and insert --brake--.
Column 3, line 29, delete "purposed" and insert --purposes--.
Column 5, line 7, delete "is" second occurance and insert --it--;
column 5, line 20, delete "is" second occurance and insert --it--;
column 5, line 22, after positions delete "so that the".
Column 6, line 57, delete "disk" and insert --disks--.
Column 7, line 14, delete "that" and insert --the--;
column 7, line 31, delete "38a" and insert --38A--;
column 7, line 54, insert --with-- after aligned.
Column 8, line 8, delete "handle" and insert --handles--.
Column 9, line 43, delete the "comma";
column 9, line 44, delete "[".

Signed and Sealed this

Twenty-sixth Day of November 1996

Attest:

BRUCE LEHMAN

Attesting Officer​ ​ ​ ​ Commissioner of Patents and Trademarks